(12) United States Patent
Nadal

(10) Patent No.: US 9,955,818 B2
(45) Date of Patent: *May 1, 2018

(54) COOKING DEVICE FOR A SOLID-FUEL COOKER INCLUDING TUBULAR FUEL CONTAINER AND RELATED METHODS

(71) Applicant: Fire Butler, LLC, Beverly Hills, FL (US)

(72) Inventor: Vincent T. Nadal, Beverly Hillls, FL (US)

(73) Assignee: FIRE BUTLER, LLC, Beverly Hills, FL (US)

( * ) Notice: Subject to any disclaimer, the term of this patent is extended or adjusted under 35 U.S.C. 154(b) by 357 days.

This patent is subject to a terminal disclaimer.

(21) Appl. No.: 14/879,168

(22) Filed: Oct. 9, 2015

(65) Prior Publication Data
US 2016/0183724 A1    Jun. 30, 2016

Related U.S. Application Data

(63) Continuation-in-part of application No. 14/587,248, filed on Dec. 31, 2014, now Pat. No. 9,669,500.

(51) Int. Cl.
*F24B 3/00*    (2006.01)
*A47J 37/07*    (2006.01)

(52) U.S. Cl.
CPC ....... *A47J 37/0763* (2013.01); *F23H 2700/00* (2013.01)

(58) Field of Classification Search
CPC .............. A47J 37/0763; A47J 37/0786; A47J 37/0713; A47J 37/0704; A47J 37/0694; A47J 37/044; F23H 2700/00; B23P 19/00; F24B 1/205; A21B 3/155; A23B 7/144; F24C 11/00; F24C 3/14; F24C 1/205; F24C 15/34; A01G 13/06; G07F 17/0078

See application file for complete search history.

(56) References Cited

U.S. PATENT DOCUMENTS

| | | |
|---|---|---|
| 1,042,273 A | 10/1912 | Roe |
| 1,447,029 A | 2/1923 | Manchester |
| 2,894,448 A | 7/1959 | Henderson et al. |
| 3,217,634 A | 11/1965 | Fox |
| 3,688,758 A | 9/1972 | Stephen et al. |
| 3,765,397 A | 10/1973 | Henderson |
| D229,277 S | 11/1973 | Kong |
| D244,985 S | 7/1977 | Folke |

(Continued)

OTHER PUBLICATIONS

Product Details Part #307416, "Rapidfire® Chimney Starter," downloaded Oct. 8, 2015, pp. 1-6.

*Primary Examiner* — Alfred Basichas
(74) *Attorney, Agent, or Firm* — Allen, Dyer, Doppelt + Gilchrist, P.A.

(57) ABSTRACT

A cooking device may be for a solid-fuel cooker that includes a firebox for carrying solid-fuel therein and having a base and at least one sidewall extending upwardly from the base, and a cooking plate to be carried adjacent the firebox and defining a cooking surface. The cooking device may include a tubular fuel container for carrying the solid-fuel therein, and to be carried within the firebox and spaced inwardly from the at least one sidewall. The tubular fuel container has upper and lower open ends adjacent the cooking surface and the base of the solid-fuel cooker, respectively. The cooking device may also include a solid cover carried by the upper open end of the tubular fuel container.

27 Claims, 22 Drawing Sheets

(56) References Cited

U.S. PATENT DOCUMENTS

| | | |
|---|---|---|
| D249,448 S | 9/1978 | Vache |
| 4,430,985 A | 2/1984 | Huneycutt |
| 4,592,334 A | 6/1986 | Logan, Jr. |
| 4,777,927 A | 10/1988 | Stephen et al. |
| 5,074,279 A | 12/1991 | Sainsbury |
| 5,094,221 A | 3/1992 | Ho |
| 5,404,864 A | 4/1995 | Kent, Jr. |
| D379,900 S | 6/1997 | Gillam et al. |
| 5,687,704 A | 11/1997 | Lerch et al. |
| 5,797,386 A | 8/1998 | Orr |
| 5,964,212 A | 10/1999 | Thompson |
| 6,205,996 B1 | 3/2001 | Ryan |
| 6,213,006 B1 | 4/2001 | Reardon et al. |
| 6,302,096 B1 | 10/2001 | Duncan |
| 6,598,598 B1 | 7/2003 | Bratsikas |
| D479,941 S | 9/2003 | Blanchette |
| 6,688,301 B1 | 2/2004 | McNeill |
| 7,032,587 B2 | 4/2006 | McNeill |
| D544,753 S | 6/2007 | Tseng |
| 7,241,466 B2 | 7/2007 | Dellinger |
| D627,591 S | 11/2010 | Wade |
| 8,166,870 B2 | 5/2012 | Badin |
| D680,799 S | 4/2013 | Chung |
| 8,578,927 B2 | 11/2013 | Gustavsen |
| 2005/0039612 A1 | 2/2005 | Denny |
| 2006/0042475 A1 | 3/2006 | Craig |
| 2007/0087297 A1 | 4/2007 | Long |

COOKING DEVICE FOR A SOLID-FUEL COOKER INCLUDING TUBULAR FUEL CONTAINER AND RELATED METHODS

TECHNICAL FIELD

The present invention relates to the field of cooking, and, more particularly, to solid-fuel cookers and related methods.

BACKGROUND

A cooker, and more particularly, an outdoor cooker, for example a barbeque grill, is a relatively popular cooking device. A typical barbeque grill, for example, provides cooking heat from below where the food it to be cooked and is generally fueled from natural or propane gas or charcoal.

Different cooking techniques may be used to cook using a barbeque grill. For example, grilling often refers to using a barbeque grill where the food is cooked using a high heat from a low-smoke fuel (e.g., propane or natural gas) for a relatively short time and wherein a cooking flame directly contacts the food. Another cooking technique may be referred to as smoking, wherein the food is cooked at a relatively low temperature for a relatively long time over indirect heat generated from a relatively high-smoke fuel (e.g., charcoal). The cooking flame, if any, generally does not directly contact the food being cooked in the smoking technique.

Unlike a natural gas or propane gas based barbeque or cooker, regulating a cooking temperature within a solid fuel cooker, for example, a charcoal-based cooker may be relatively difficult. For example, with respect to a charcoal cooker, it may be particularly difficult to achieve a relatively constant desired temperature for a relatively long duration as when using the smoking technique. A longer duration cooking time, for example greater than six (6) hours may be particularly desirable for cooking a larger amount of food, for example, a turkey or other large amount of meat using the smoking technique. Additionally, a longer duration cooking time may be desirable for slow-cooking, such as for example, brisket or pork.

Several charcoal-based cookers attempt to regulate temperate while sustaining charcoal burning, for example. One such cooker is disclosed in U.S. Pat. No. 4,430,985 to Huneycutt. The Huneycutt cooker discloses a thermostatically controlled charcoal cooker that is includes a heat sensitive spring coupled to a set of valve. The valves are opened and closed based upon heat sensed by the heat sensitive spring.

U.S. Pat. No. 6,688,301 to McNeil discloses a barbeque accessory to sustain charcoal burning. More particularly, the McNeil patent discloses a loop received into a heat chamber of a charcoal barbeque grill and that rests on a bottom edge of the charcoal barbeque grill. The loop has opening therein. Charcoal is positioned outside the loop.

To provide improved temperature regulation, for example, to retain moisture, several charcoal-based cookers use different materials rather than metal. For example, the Big Green Egg available from Big Green Egg, Inc. of Atlanta, Ga. uses a ceramic chamber to retain heat and maintain food moisture. However, such cookers are generally relatively expensive and often require the purchase of a new cooker to obtain the regulated temperature for long duration feature.

SUMMARY

A cooking device may be for a solid-fuel cooker that may include firebox for carrying solid-fuel therein and having a base and at least one sidewall extending upwardly from the base, and a cooking plate to be carried adjacent the firebox and defining a cooking surface. The cooking device may include a tubular fuel container for carrying the solid-fuel therein, and to be carried within the firebox and spaced inwardly from the at least one sidewall. The tubular fuel container may have upper and lower open ends adjacent the cooking surface and the base of the solid-fuel cooker, respectively. The cooking device may also include a solid cover carried by the upper open end of said tubular fuel container. Accordingly, the cooking device may provide increased duration and increased temperature.

The tubular fuel container may include at least one sidewall having a plurality of air openings therein. The solid cover may extend outwardly beyond an outer edge of the upper open end of the tubular fuel container, for example.

The solid-fuel cooker may further include a solid-fuel plate carried below the cooking surface. The open lower end of the tubular fuel container may be carried by the solid-fuel plate, for example. The tubular fuel container may have a plurality of temperature control openings therein adjacent the solid cover. The plurality of temperature control openings may have a first opening area associated therewith, for example. The tubular fuel container may have a plurality of air openings therein adjacent the lower open end and having a second opening area associated therewith, and the second opening area may be greater than the first opening area, for example.

The cooking device may also include a mesh plate carried within the tubular fuel container adjacent the lower open end. The tubular fuel container may have a rectangular shape. The tubular fuel container may have a circular shape. The solid cover may have a circular shape, for example.

A method aspect is directed to a method of making a cooking device for a solid-fuel cooker that includes a firebox for carrying solid-fuel therein and having a base and at least one sidewall extending upwardly from the base, and a cooking plate to be carried adjacent the firebox and defining a cooking surface. The method may include forming a tubular fuel container for carrying the solid-fuel therein, and to be carried within the firebox and spaced inwardly from the at least one sidewall, the tubular fuel container being formed to have upper and lower open ends adjacent the cooking surface and the base of the solid-fuel cooker, respectively. The method may also include forming a solid cover to be carried by the upper open end of the tubular fuel container.

DETAILED DESCRIPTION

Figure 1:
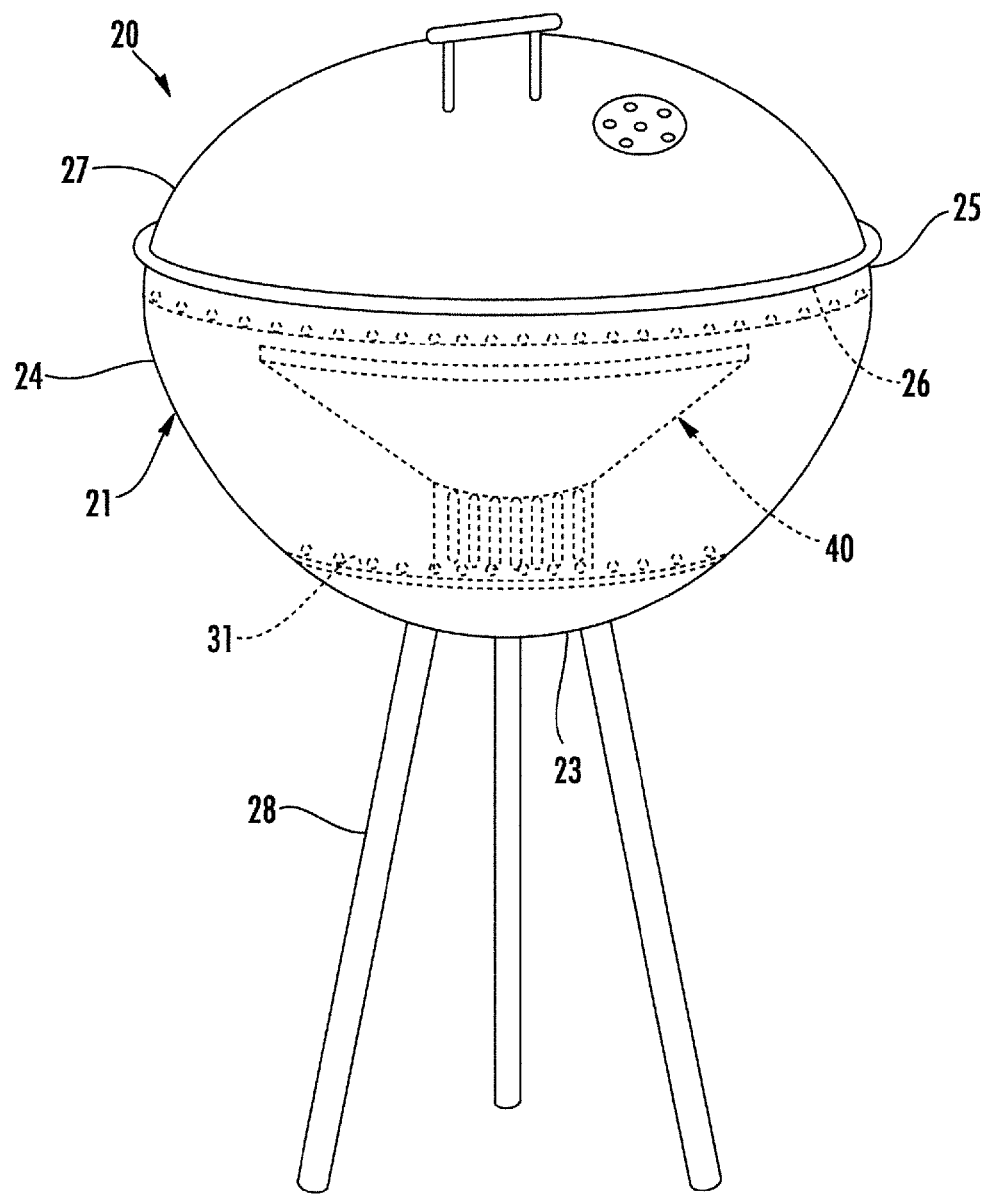
FIG. 1 is a perspective view of a solid-fuel cooker including a cooking device in accordance with an embodiment of the present invention.
Figure 2:
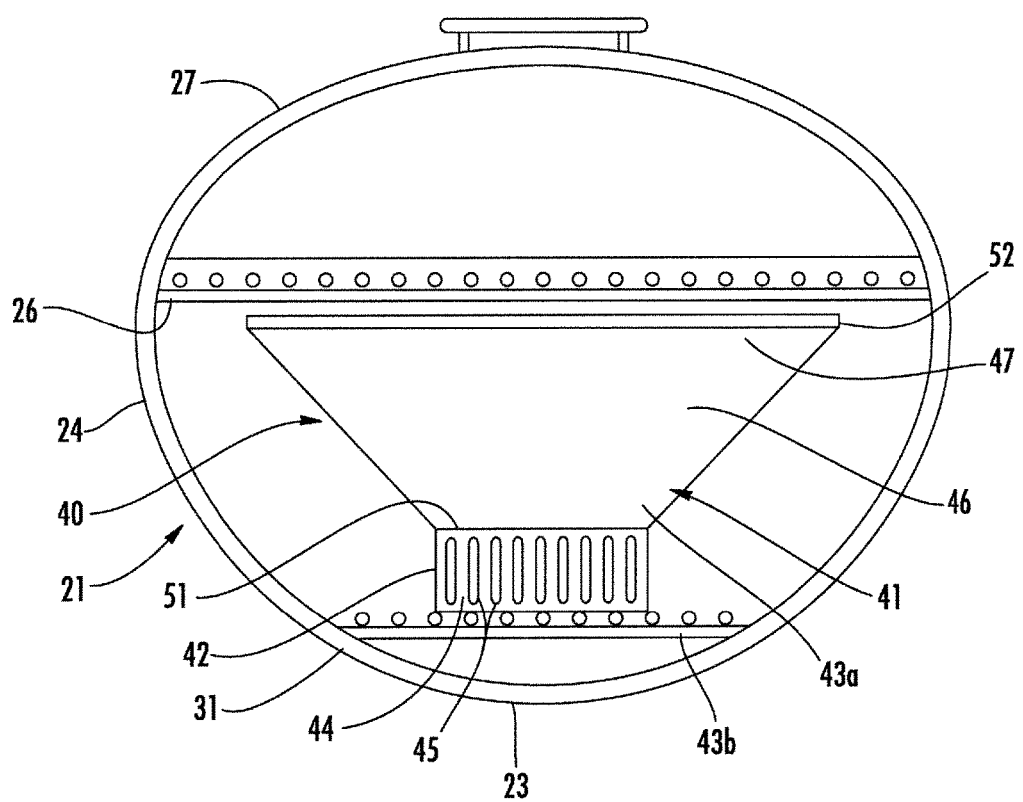
FIG. 2 is a side sectional view of a portion of the solid-fuel cooker of FIG. 1 including the cooking device.
Figure 3:
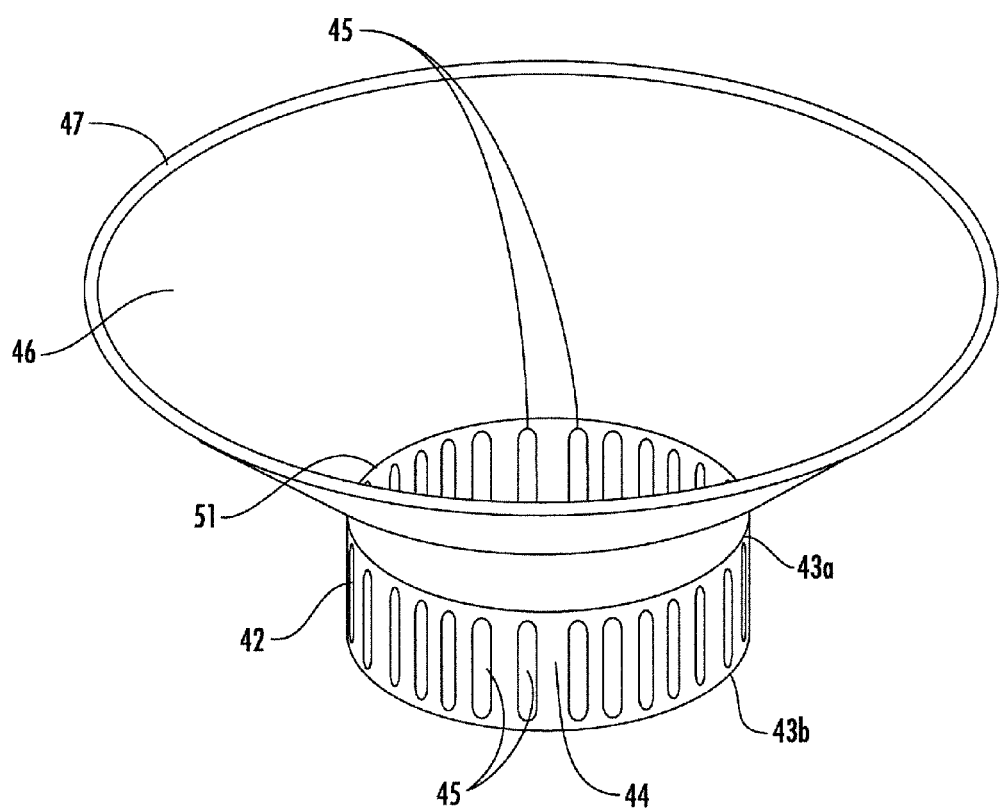
FIG. 3 is a perspective view of the cooking device of FIG. 2.
Figure 4:
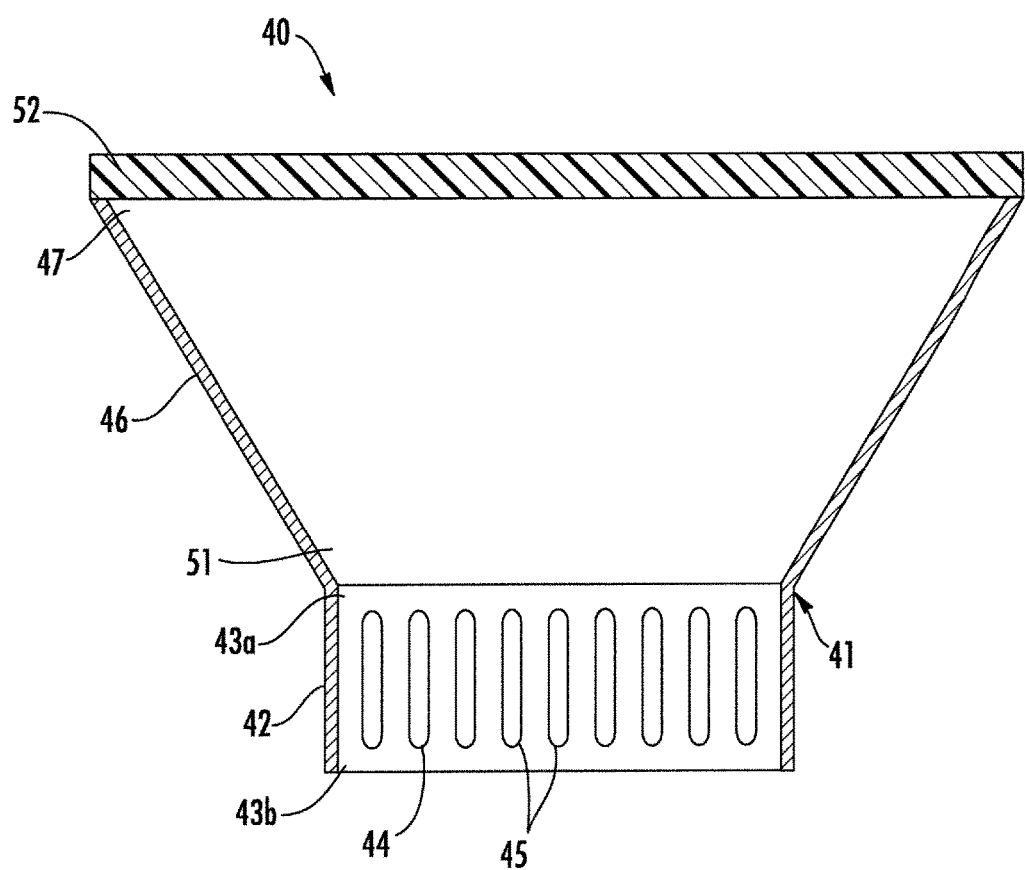
FIG. 4 is an enlarged cross-sectional view of the cooking device of FIG. 1.
Figure 5:
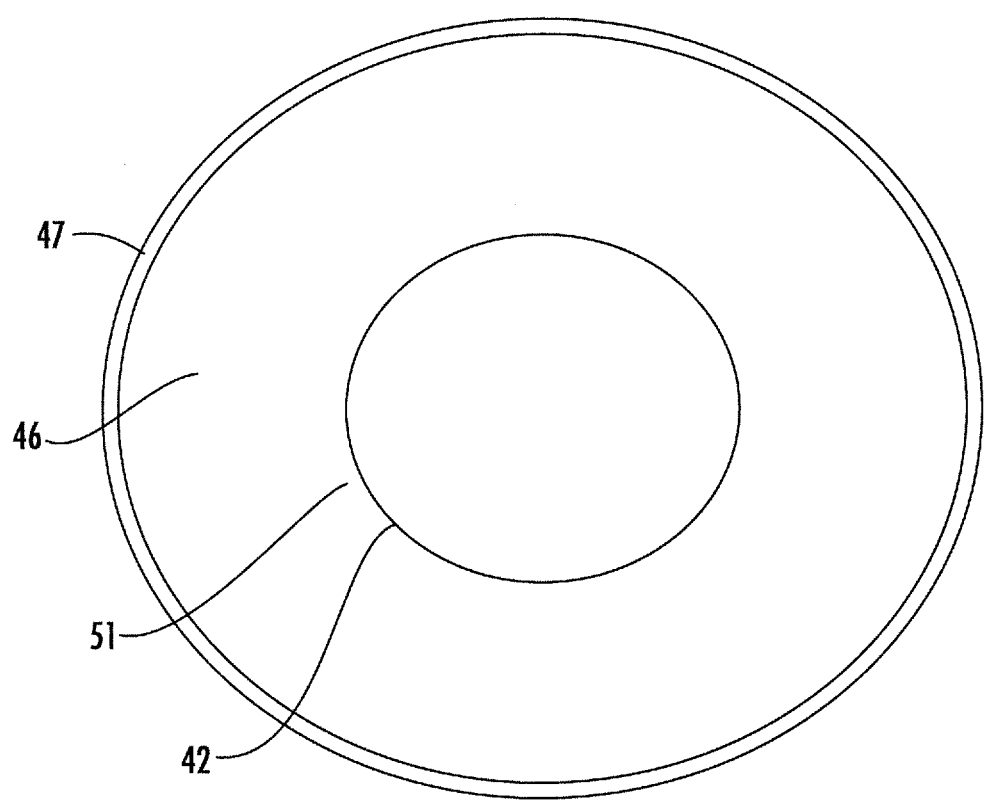
FIG. 5 is a top view of a portion of cooking device of FIG. 3 without the solid cover.
Figure 6:
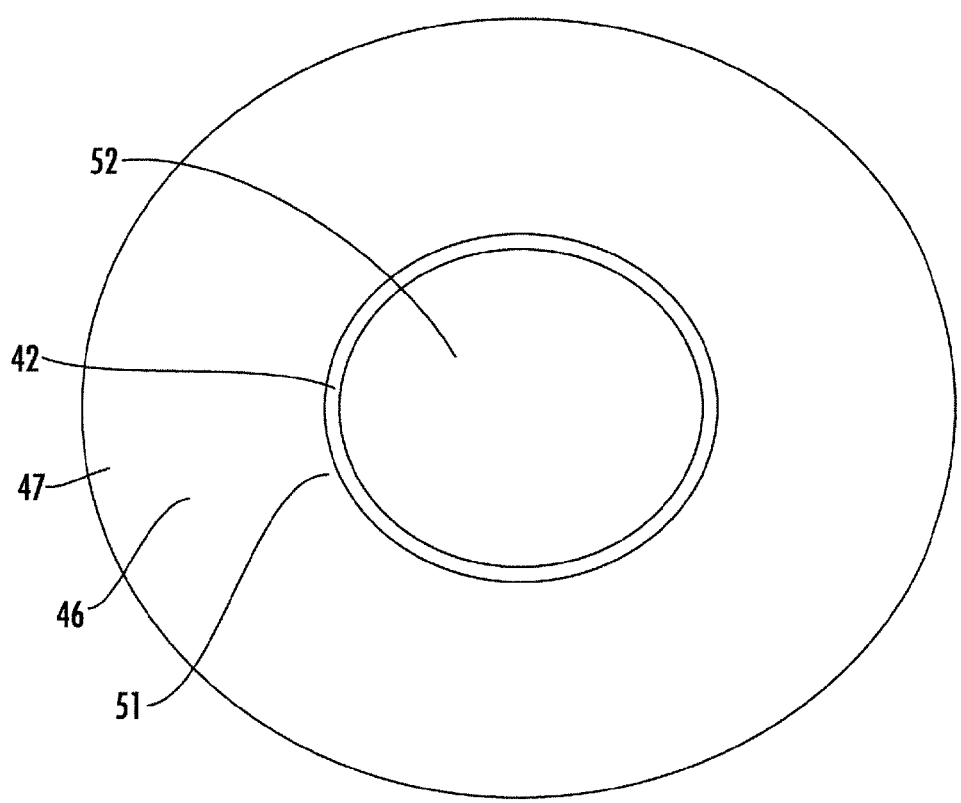
FIG. 6 is bottom view of the cooking device of FIG. 3.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation, and like numbers in increments of 100 are used to indicate like elements in different embodiments.

Referring initially to FIGS. 1-6, a cooking device 40 is for a solid-fuel cooker 20 that includes a firebox 21 for carrying solid-fuel therein. An exemplary solid-fuel may be charcoal, for example, in the form of charcoal briquettes. Of course, the solid-fuel may be another type of solid-fuel, as will be appreciated by those skilled in the art.

The firebox 21 illustratively has a base 23 a sidewall 24 extending upwardly from the base. The firebox 21 is illustratively round in shape, i.e., having one continuous sidewall, but it should be appreciated by those skilled in the art that the more than one sidewall may extend upwardly from the base, for example, to example, to define a rectangular shaped or other shaped firebox. The firebox 21 is illustratively supported by legs 28.

The solid-fuel cooker 20 also includes a cooking plate 26 carried adjacent an open upper end 25 of the firebox 21 and defining a cooking surface. In other words, food may be placed directly on the cooking plate 26 or cooking surface during operation of the solid-fuel cooker 20. The cooking plate 26 is illustratively a grate having a framework of parallel or crossed bars. The cooking plate 26 may be another type of cooking plate, for example, a griddle, and may not have opening therein.

The solid-fuel cooker 20 also includes a lid 27 that is carried by the sidewall 24 over the cooking surface or cooking plate 26. The lid 27 is removable to allow positioning and/or inspection of food during operation of the solid-fuel cooker 20. The lid 27 is replaceable to cover the cooking surface to retain heat therewithin the solid-fuel cooker 20.

The solid-fuel cooker 20 also illustratively includes a solid-fuel plate 31 carried below and spaced from the cooking plate 26. Where the solid-fuel is in the form of charcoal briquettes, the charcoal briquettes may be carried by the solid-fuel plate 31, as may typically be the case for a conventional solid fuel cooker. In some embodiments, the solid-fuel plate 31 may not be included, and the solid-fuel may sit directly on the base 23.

The cooking device 40 includes a fuel container 41 for carrying the solid-fuel therein. The cooking device 40 is carried within the firebox 21 adjacent the base 23 and spaced inwardly from the sidewall 24. In particular, the fuel container 41 may be carried by the solid-fuel plate 31, for example. In some embodiments, the solid-fuel plate 31 may have an opening or cut-out therein for receiving the fuel container 41 therein.

The fuel container 41 includes a tubular lower body 42 that has opposing open ends 43a, 43b. The fuel container 41 also includes lower body sidewall 44 that has air openings 45 therein. The tubular lower body 42 is illustratively cylindrical in shape and may be metallic, for example stainless steel. Of course, the tubular lower body 42 may be another shape, for example, rectangular and/or may be a different material. In embodiments where the solid-fuel plate 31 has an opening therein, the tubular lower body 42 is slideably received within the opening.

The air openings 45 are illustratively elongate openings and extend between the opposing open ends 43a, 43b in the lower body sidewall 44. The air openings 45 may be sized to be smaller than a charcoal briquette, for example, and may be sized to be 1.25 inches tall, ⅜ of an inch wide, and spaced apart from each other by ⅜ of an inch. In some embodiments, the lower body sidewall 44 may not have air openings, or the openings may be sized differently, for example, based upon a desired temperature, an overall size and shape of the solid-fuel cooker 20, and/or other factors, as will be appreciated by those skilled in the art.

The fuel container 41 also includes a tapered upper body 46. The tapered upper body 46 has a larger open end 47 open toward and spaced below the cooking surface or cooking plate 26 and a smaller open end 51 coupled to an upper one 43a of the opposing open ends of the tubular lower body 42. The tapered upper body 46 illustratively has a frusto-conical shape and may also be metallic, for example, stainless steel. Of course, the tapered upper body 46 may have another shape, for example, a horn shape, shape to match a rectangular shaped tubular lower body, or other shape. The tapered upper body 46 may also be a different material, which may be the same as the tubular lower body 42.

The cooking device 40 may further include a solid cover 52 carried by the larger open end 47 of the tapered upper body 46 to define an air seal with the larger open end. Unlike a cooking or solid-fuel grate, for example, that has openings therein, the solid cover 52 has no openings so that the entire enlarged upper open end 47 of the tapered upper body 46 is sealed. The solid cover 52 may have a surface area greater than half of a surface area of the cooking surface or grate 26.

The solid cover 52 may be ceramic, for example, as will be appreciated by those skilled in the art. The solid cover 52 may also be metal, for example, stainless steel. Of course the solid cover 52 may be other and/or additional materials, for example, that are suitable for high-heat. As will be appreciated by those skilled in the art, and as will be described in further detail below, the air seal allows oxygen to the solid-fuel to be limited to control is burning, and thus temperature.

During operation of the cooking device 40, a desired amount of solid-fuel is placed within the fuel container 41, for example, based upon a desired duration and temperature. For a longer duration, the solid-fuel generally will fill up to a top of the tapered upper body 46. The solid-fuel is ignited, for example, by externally igniting a handful amount of the solid-fuel and replacing it in the fuel container 41. The solid plate 52 is then positioned on the larger open upper end 47 of the tapered upper body 46 so that an air-tight seal is formed therebetween. Air is drawn into the firebox 21 through an air port in the firebox, typically in the base 23, for example. The drawn in air provides the oxygen to keep the solid-fuel burning. The solid-fuel adjacent the air openings 45 is burned as this is where the air is drawn into the fuel container 41.

Solid-fuel adjacent the tapered upper body 46, specifically, the larger open end 47 of the tapered body is not burned since there is generally no air available as it is being used adjacent the air openings 45. There is no air available adjacent the larger open end 47 of tapered upper body 46 because of the air seal defined by the solid cover 52 and the larger open upper end of the tapered upper body. In other words, should the solid cover 52 be removed during operation or burning of the solid-fuel, air would thus be supplied to the enlarged open end 47 of the tapered upper body 46 (e.g., where a majority of the unburned solid-fuel is contained) causing a large amount of the solid-fuel to ignite. Thus, removal of the solid cover 52 may be highly undesirable as this would cause highly increased temperatures and reduced duration. As the solid-fuel burns, the ashes thereof may be expelled through the air openings 45.

Figure 7:
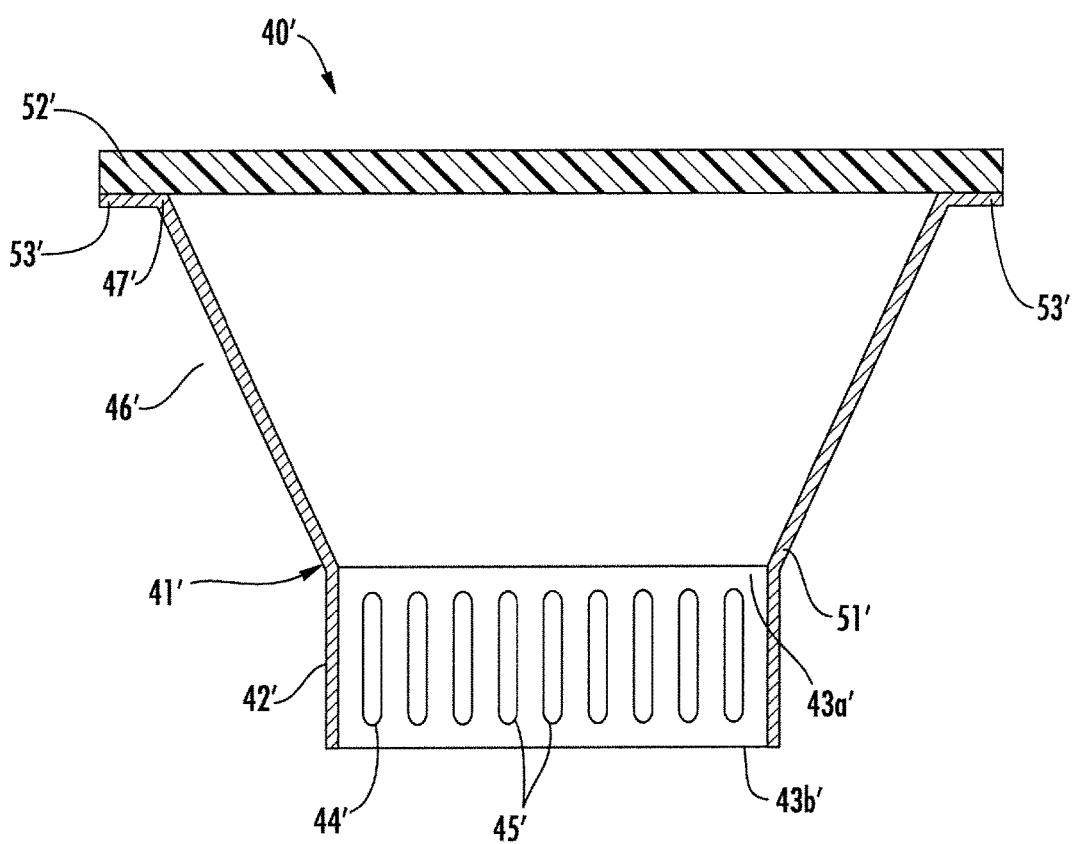
FIG. 7 is an enlarged cross-sectional view of a cooking device according to another embodiment of the present invention.

Referring now to FIG. 7, in an embodiment the fuel container 41' may include a cover lip 53' extending from the larger open end 47' of the tapered upper body 46'. Illustratively, the cover lip 53' extends outwardly, but in some embodiments may extend inwardly, or both inwardly and outwardly. The cover lip 53' may advantageously provide a larger surface area for sealing the cover 52' to the larger open end 47' of the tapered upper body 46'. The cover lip 53' may also provide a larger coupling area for a seal, for example as described below.

Figure 8:
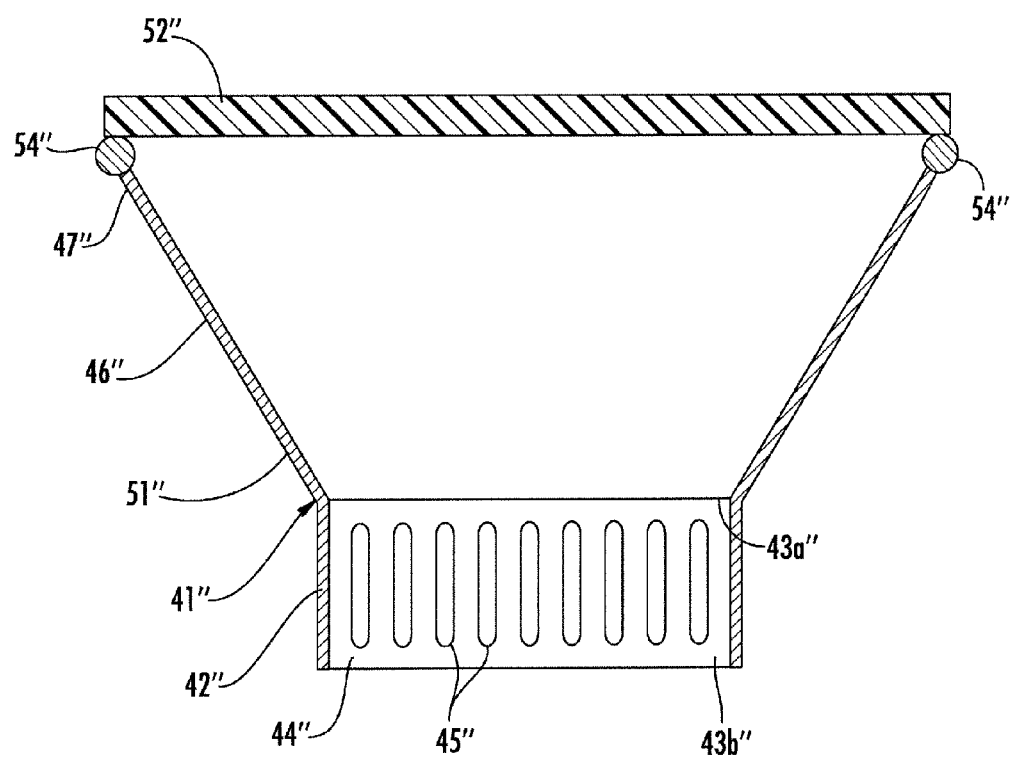
FIG. 8 is an enlarged cross-sectional view of a cooking device according to another embodiment of the present invention.

Referring now to FIG. 8, in another embodiment, the cooking device 40" may also include a seal 54" between the solid cover 52" and the larger open end 47" of the tapered upper body 46". The seal 54" may include graphite, for example. The seal 54" may also or additionally be a mesh or braided seal, for example, similar to the type found on many electric oven doors, as will be appreciated by those skilled in the art.

Figure 9:
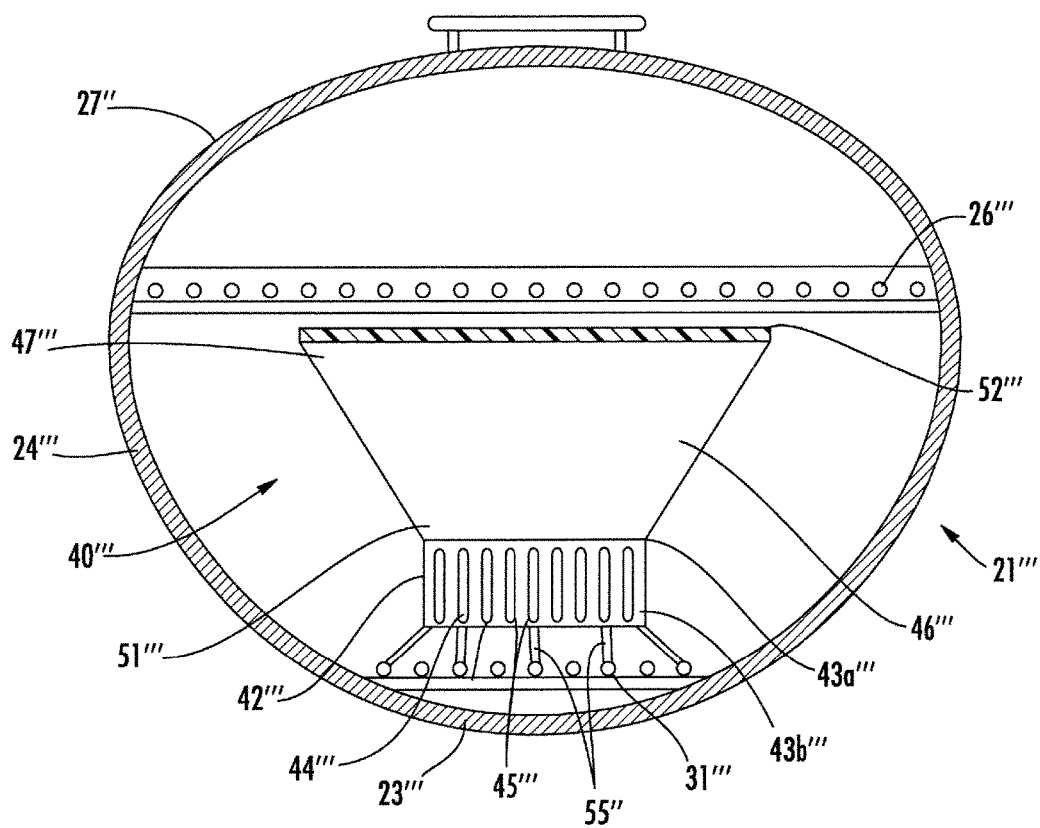
FIG. 9 is a side-sectional view of a solid-fuel cooker including a cooking device in accordance with another embodiment of the present invention.

Referring now to FIG. 9, in some embodiments, the cooking device 40''' may include legs 55''' that extend from the tubular lower body 42'''. The legs 55''' space the fuel container 41''' above the solid-fuel plate 31''' and closer to the cooking surface 26'''. The legs 55''' may be adjustable length legs, for example.

Figure 10:
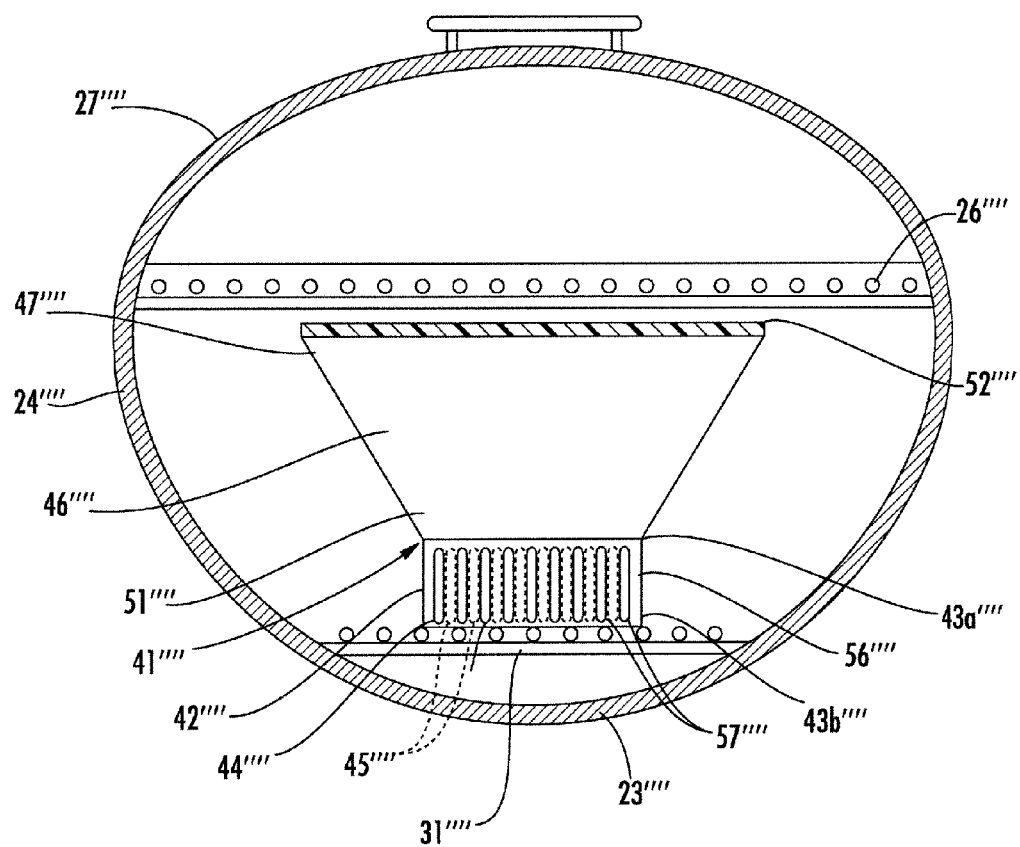
FIG. 10 is a side-sectional view of a solid-fuel cooker including a cooking device in accordance with another embodiment of the present invention.

Referring now to FIG. 10, in another embodiment, the fuel container 41"" may include a collar 56"" having a plurality of spaced apart air control openings 57"" therein.

The collar 56"" may be slideably positioned around the tubular lower body 42"" and may be rotated or configured to selectively cover at least a portion of the air openings 45"". For example, the collar 56"", which may be considered a damper, may be positioned to fully close the air openings 45"" by misaligning the air openings and the air control openings 57"". In contrast, the collar 56"" may be positioned to fully open the air openings 57"" by aligning the air openings and the air control openings. The collar 56"" may be configured to a partial alignment between the air openings 45"" and the air control openings 57"", for example, for further temperature and duration control as will be appreciated by those skilled in the art. The collar 56"" may be the same material as the tubular lower body 42"", for example, stainless steel. The collar 56"" may be another material.

Figure 11:
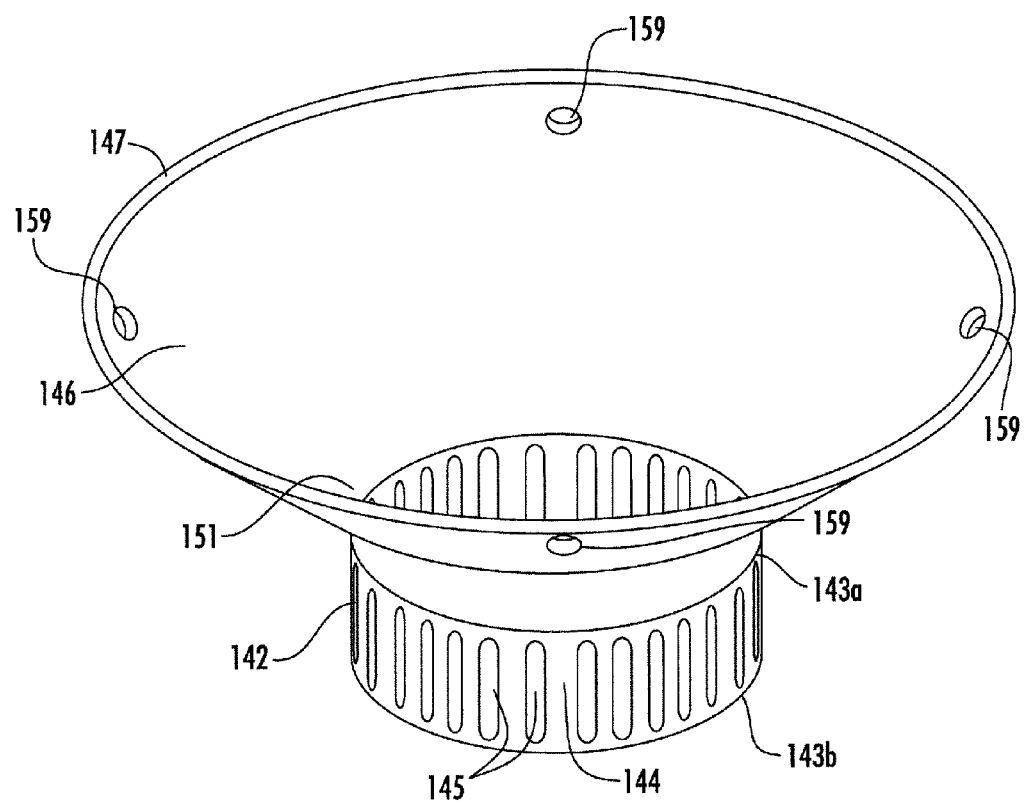
FIG. 11 is a perspective view of a cooking device in accordance with another embodiment of the present invention.
Figure 12:
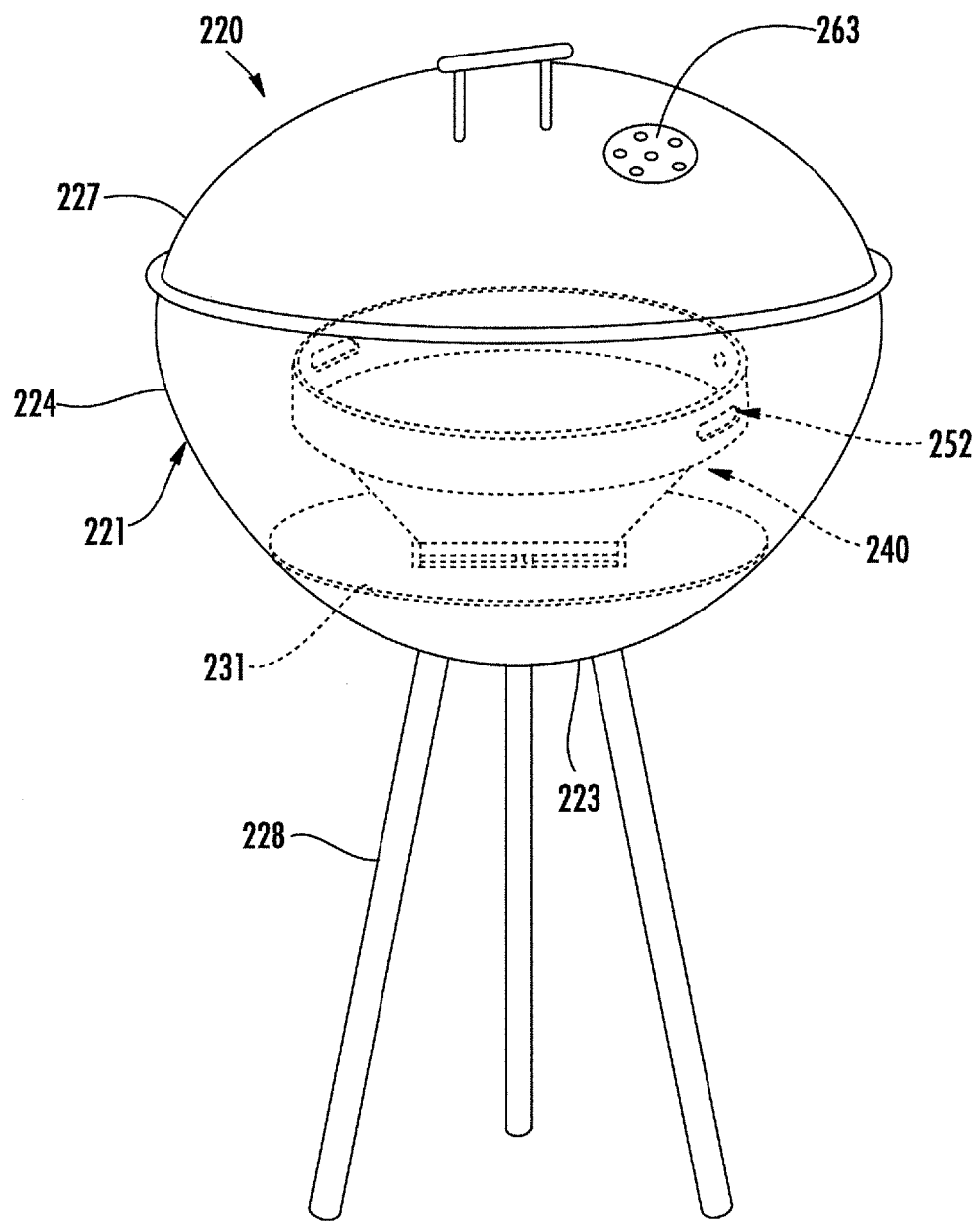
FIG. 12 is a perspective view of a solid-fuel cooker including a cooking device in accordance with another embodiment.
Figure 13:
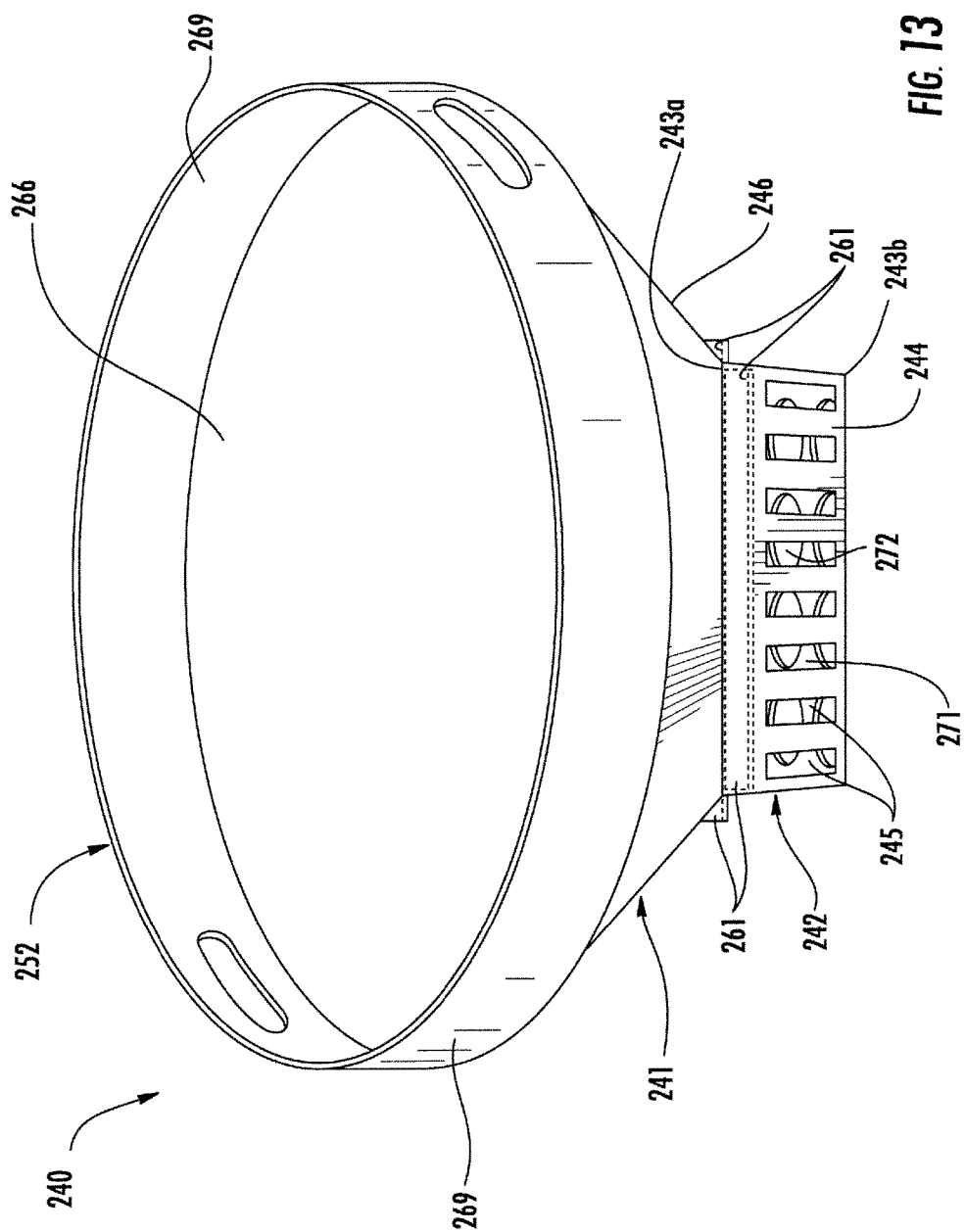
FIG. 13 is a perspective view of the cooking device of FIG. 12 removed from the solid-fuel cooker.

Referring now to FIG. 11, in another embodiment, temperature control openings 159 in the tapered upper body 146 adjacent the larger open upper end 147. More particularly, the temperature control openings 159 may be spaced below the solid cover 152, for example, an inch. Each temperature control opening 159 is about one inch in diameter and spaced equidistant around the tapered upper body 149. Illustratively, there are four temperature control openings 159, but it should be appreciated that there may be a different number of temperature control openings 159. As will be appreciated by those skilled in the art, the temperature control openings 159 allow a relatively small amount of air to enter the solid-fuel container 140. The entering air is pulled toward the solid-fuel when burning, thus creating a draft of air. The draft provides more oxygen to the burning solid-fuel, and thus the temperature increases, but the duration of burning of the solid-fuel is relatively unchanged.

It should be understood that there may any number of temperature control openings 159 having any size, however, too many temperature control openings has the same effect as cooking without the solid cover 152, which is undesirable. As described above, without the solid cover 152, the solid-fuel will burn at an undesirably high temperature and for an undesirably short time.

Moreover, in some embodiments, the temperature control openings 159 may be include a damper to permit selective opening and closing (partial and/or full) of each of the temperature control openings. For example, the damper may be in the form of a removable plug having an opening therein smaller than the temperature control opening (i.e., to make the temperature control opening smaller), or the removable plug may fully close the respective temperature control opening. In other embodiments, the damper may operate similar to the collar described above with respect to FIG. 10 so that the size of the temperature control opening varies based upon rotation or sliding the damper, as will be appreciated by those skilled in the art.

As will be appreciated by those skilled in the art, the cooking device 40 may be particularly advantageous as it may be retrofitted or added (i.e., as an aftermarket part) to nearly any solid-fuel cooker at a relatively low cost. Thus, there may be no need to buy a new solid-fuel cooker to achieve relatively long cooking duration and with a relatively stable or maintained temperature, as a new solid-fuel cooker is relatively expensive. For example, the cooking device may provide or maintain temperatures in a range of 190° F. to 275° F. for at least seven (7) hours, and more particularly, fourteen (14) hours. However, the duration may be based upon the type of solid-fuel. For example, lump charcoal may burn quicker than briquettes by about 20%.

A method aspect is directed to a method of making cooking device 40 for a solid fuel cooker 20 that includes a firebox 21 for carrying solid-fuel therein and having a base 23 and at least one sidewall 24 extending upwardly from the base, a cooking plate 26 carried adjacent an open upper end 25 of the firebox and defining a cooking surface, and a lid 27 to be carried by the at least one sidewall over the cooking surface. The method includes forming a fuel container 41 for carrying the solid-fuel therein, and to be carried within the firebox 21 adjacent the base 23 and spaced inwardly from the at least one sidewall 24. Forming the fuel container 41 includes forming a tubular lower body 42 having opposing open ends 43a, 43b and at least one lower body sidewall 44 having a plurality of air openings 45 therein, and forming a tapered upper body 46 having a larger open end 47 open toward and spaced below the cooking surface 26 and a smaller open end 51 coupled to an upper one of the opposing open ends 43a of the tubular lower body. The method also includes forming a solid cover 52 to be carried by the larger open end 47 of the tapered upper body 46 to define an air seal with the larger open end.

Figure 14:
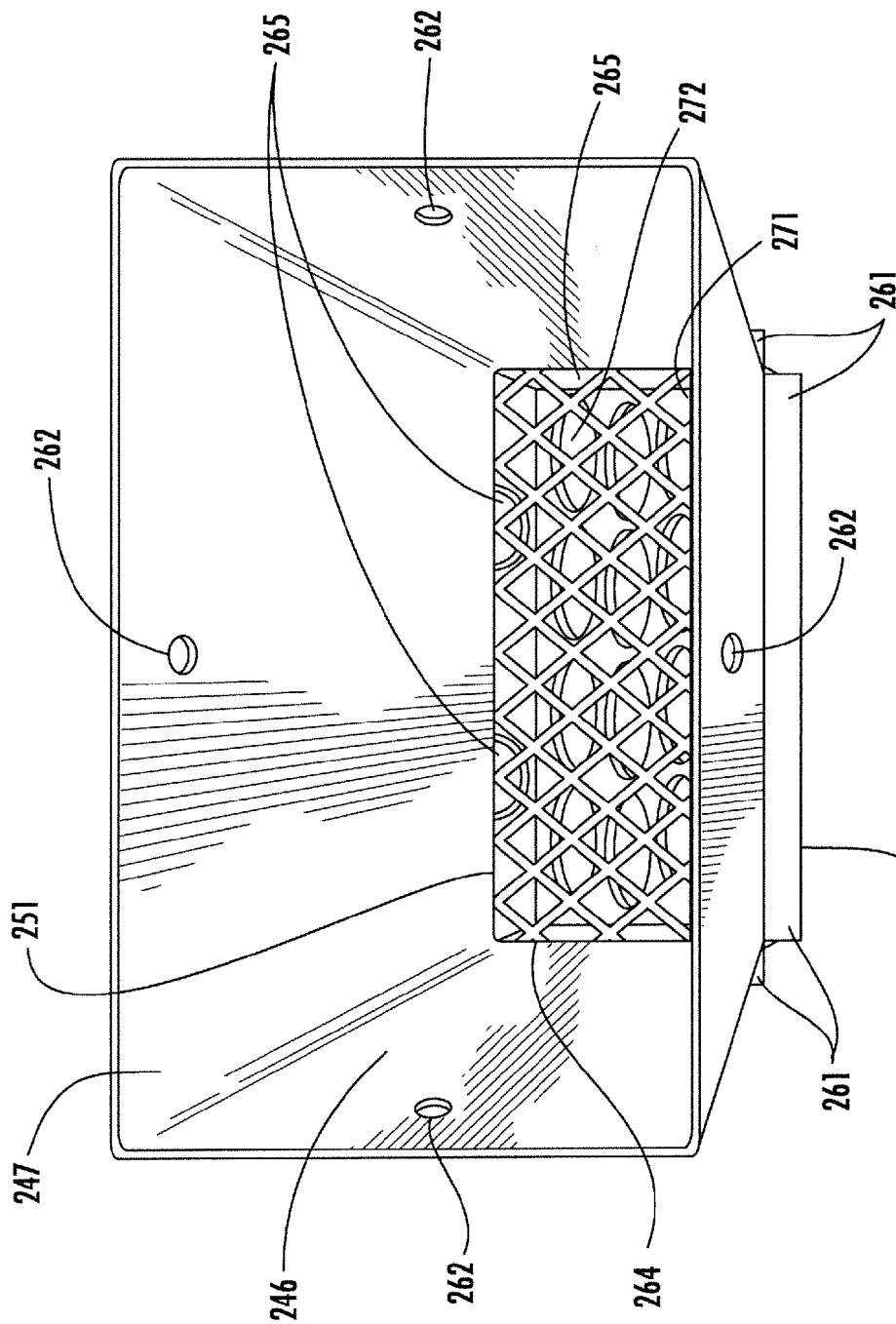
FIG. 14 is a perspective view of the cooking device of FIG. 13 with the solid cover removed.
Figure 15:
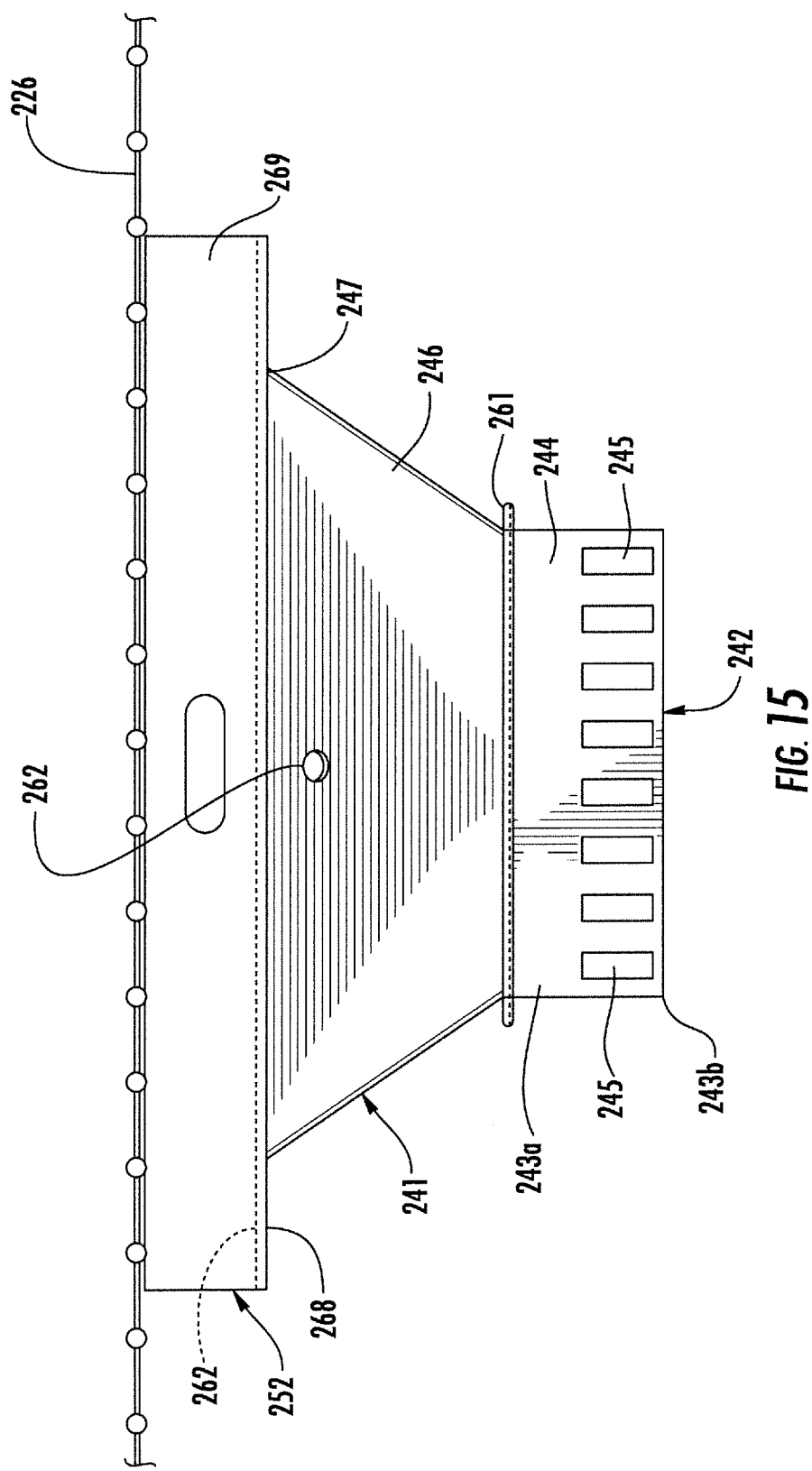
FIG. 15 is a side view of the cooking device of FIG. 13.
Figure 16:
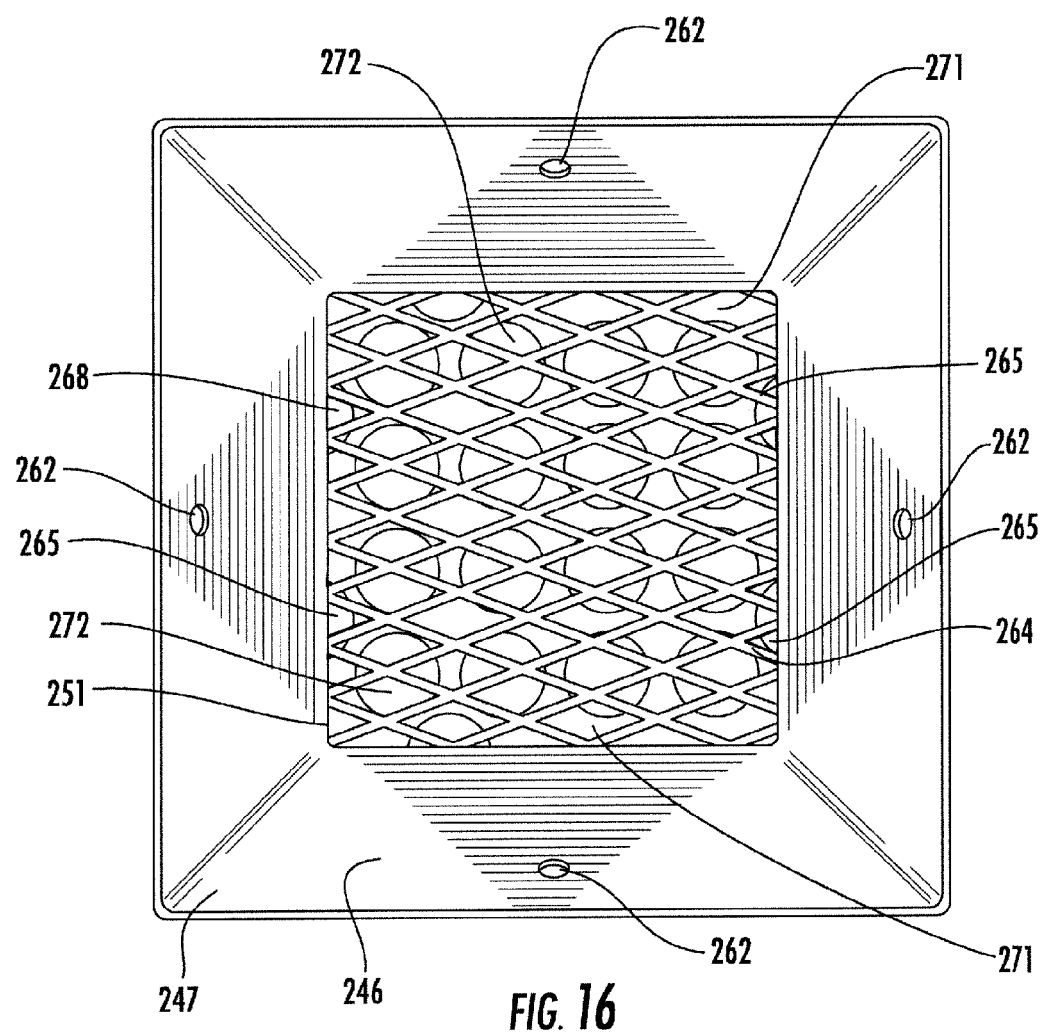
FIG. 16 is a top view of the cooking device of FIG. 14.

Referring now to FIGS. 12-17, in another embodiment, the tubular fuel container 241 has a rectangular shaped tubular lower body 242 and a rectangular horn shaped upper body 246. More particularly, the rectangular shaped tubular lower body 242 illustratively has a square shape and the tapered upper body 246 has a square horn shape. Of course, in other embodiments, the rectangular shaped tubular lower body 242 and a rectangular horn shaped upper body 246 may each have a different shape. As may be appreciated by those skilled in the art, a rectangular shaped tubular lower body 242 and a rectangular horn shaped upper body 246 may be more desirable relative to circular shape, for example, for ease of manufacturing and increased stability. Moreover, it will be appreciated by those skilled in the art that by having a rectangular shaped tubular lower body 242 and a rectangular horn shaped upper body 246, there is no lip or shelf for which solid fuel may become caught (FIGS. 14 and 16). In other words, the fuel container 241, as a gravity fed container, allows the solid-fuel to fall more smoothly as it burns so as to not impede or adversely affect heat distribution or cooking patterns.

The cooking device 240 also includes a solid-fuel plate 231 (FIG. 12), which illustratively has a circular or round shape. The solid-fuel plate 231 has a circular shape, for example, to match the shape of the solid-fuel cooker 220, for example. In other words, if the solid-fuel cooker 220 has another shape, the solid-fuel plate 231 may have a different shape. The solid-fuel plate 231 has an opening therein for receiving the fuel container 241 therein. More particularly, the opening is illustratively rectangular in shape to receive the rectangular shaped tubular lower body 242 therein. The lower or smaller open end 251 of the rectangular horn shaped upper body 246 has a mechanical stop 261 so that the fuel container 241 is suspended by the solid-fuel plate 231. More particularly, the mechanical stop 261 extends outwardly from each of the four sidewalls 244 adjacent the open upper end 243a. In other words, the solid-fuel plate 231 is sized so that the rectangular shaped tubular lower body 242 is spaced from the base 223 of the solid-fuel cooker 220 to allow ash from the burnt or used solid fuel to pass therefrom and to allow air to contact the solid fuel to facilitate burning.

The rectangular horn shaped upper body 246 has temperature control openings 262 therein adjacent the larger open end 247. Illustratively, there are four temperature control openings, one on each of the four sides of the rectangular horn shaped upper body 246. There may be a different number of temperature control openings 262, for example. It will be appreciated by those skilled in the art, that the temperature control openings allow a certain amount of air to enter within the fuel container from the top to allow the solid fuel to burn. Of course, the temperature may be further controlled by air vents 263 in the cover 227 of the solid-fuel cooker 220 and/or the base 223 of the firebox 221. In some embodiments, there may be no temperature control openings.

The temperature control openings 262 may each have a size of about ⅜ of an inch in diameter for an area of 0.11 square inches per opening. The total area for the four temperature control openings may thus be 0.44 square inches.

The air openings 245 may each have a generally rectangular shape, for example, each having a dimension of ⅜ of an inch by 1.5 inches for total area of 0.5625 inches per opening. In some embodiments there may be thirty-two air openings 245 for a total air opening area of 18 square inches. Thus, the temperature control openings 262 may have a total area less than the total area of the air openings 245, for example five percent. In some embodiments, the total area of the temperature control openings 262 may be in a range of 1-10% of the total area of the air openings 245, for example, for desired temperature control.

Figure 17:
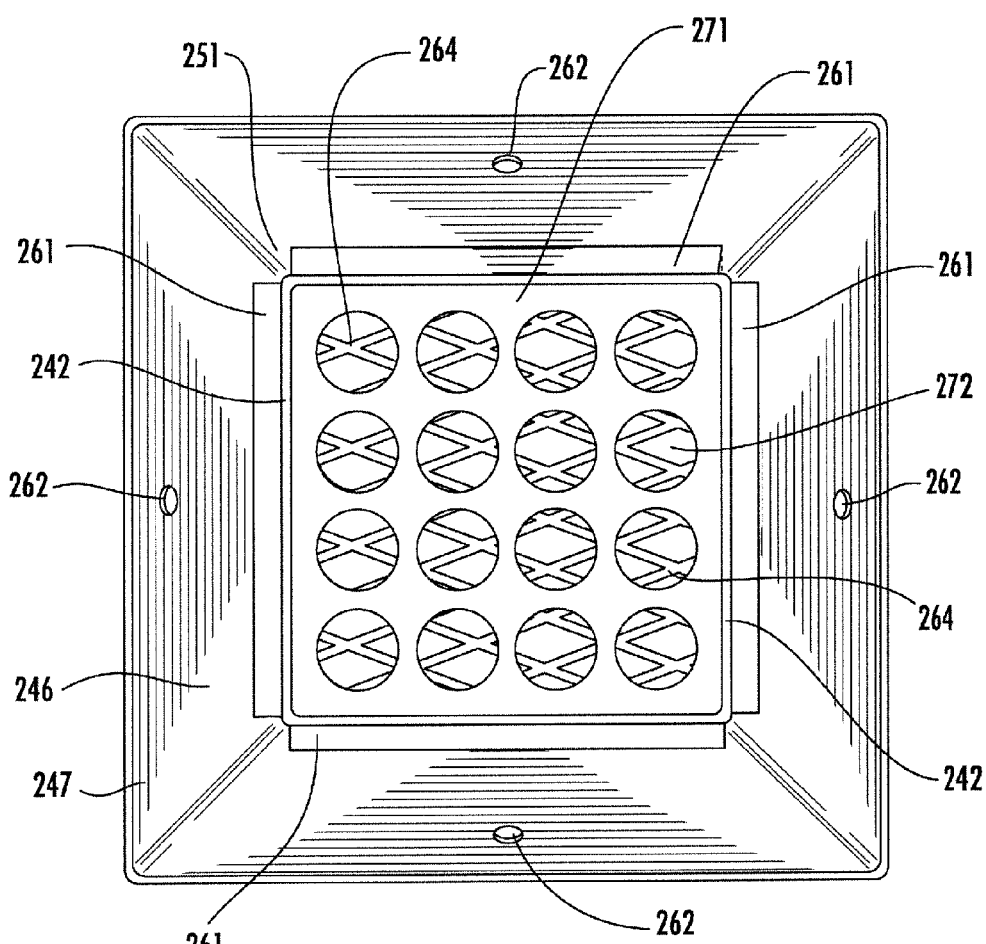
FIG. 17 is a bottom view of the cooking device of FIG. 14.

A mesh searing plate 264 is carried within the rectangular horn shaped upper body 246 (FIGS. 14, 16, 17). The mesh searing plate 264 rests on supports 265 that extend inwardly from the smaller open end 251 of the rectangular horn shaped upper body 246 so that the user may easily remove the mesh searing plate when undesired. More particularly, the mesh searing plate 264 is carried adjacent the joint between the rectangular horn shaped upper body 246 and the rectangular shaped tubular lower body 242. Of course, the mesh searing plate 264 may be carried anywhere within the rectangular shaped tubular lower body 242 or the rectangular horn shaped upper body 246. The mesh searing plate 264 advantageously serves as a floor for the solid fuel and permits burned solid fuel to fall therethrough. The mesh searing plate 264 shortens the distance between burning solid fuel and any cooking surfaces, for example, as described in further detail below, thus increasing the temperature of the cooking surfaces. More defined heating patterns may also occur, as will be appreciated by those skilled in the art.

The rectangular shaped tubular lower body 242 may also include a bottom plate 271 having openings 272 therein. The bottom plate may be positioned adjacent the lower open end 243b. It should be understood that while a bottom plate 271 is carried by the lower open end 243b, the lower end is still considered to be open by way of the openings 272. The bottom plate 271 may provide increased structural rigidity and increased air control, which may, in turn, allow more precise control of heating times and temperatures, as will be skilled in the art. Moreover, the bottom plate 271 may retain larger unburned solid fuel within the fuel container 241, for example, instead of falling through to the base 223 of the solid-fuel cooking device 220.

The solid cover 252, which is carried by the larger open end 247 of the rectangular horn shaped upper body 246, includes a cover base 266 having opposing first and second surfaces. The solid cover 252 is illustratively round in shape, for example, to match the shape of the solid-fuel cooker 220. Of course, the solid cover 252 may be another shape. The first surface 267 defines a second cooking surface (FIG. 15). The cooking plate 226, which is illustratively in the form of a grate and is described in detail above, defines the first cooking surface. The second surface 268 is carried by or coupled to the larger open end 247 of the rectangular horn shaped upper body 246 (i.e., facing the solid fuel and exposed to the flame) to define an air seal therewith. A cover sidewall 269 extends upwardly from a periphery of the first surface 267 of the cover base 266. The cooking plate 226 is carried by the solid-fuel cooker sidewall 224 in relatively close proximity to the cover sidewall 269 and cover base 266. In some embodiments, the cover sidewall 269 carries the cooking plate 226 in spaced relation from the cover base 266. In other words, the upper end of the cover sidewall 269 carries the cooking plate 226 so that it extends over the first surface 267 of the cover base 266 and also extends outwardly beyond the cover sidewall.

The solid cover 252 extends outwardly beyond an outer edge of the larger open end 247 of the rectangular horn shaped upper body 246. In other words, the solid cover 252 not only covers the larger open end 247, but also extends to adjacent the sidewall 224 of the solid-fuel cooker 220. The overhang of the solid cover 252 acts as a heat deflector by deflecting rising heat outwardly toward the sidewall 224 of the solid-fuel cooker 220. This may maintain heat for longer durations.

The cooking device 240 with the solid cover 252 as described above may be particularly advantageous as it provides multiple cooking modes. In particular, the first cooking surface defined by the cooking plate 226, is for indirect operation in a smoker or oven mode. In particular, if smoker chips are used as or with the solid fuel to produce smoke, the cooking device 240 operates in the smoker mode, while if no smoker chips are used and the burning solid fuel is not producing any smoke, the cooking device operates in the oven mode. The oven mode may be particularly useful for baking, for example.

If the second cooking surface (without the cooking plate 226), is used, the cooking device 240 operates in a hibachi mode. Accordingly, the cover base 266 may be pickled stainless steel suitable for hibachi cooking. Of course, the cover base 266 may be another material that may be suitable for hibachi cooking. Moreover, use of the mesh searing plate 264 in the hibachi mode will increase the temperature and may result in a single cooking zone, while there may be two cooking zones without the mesh searing plate.

Other covers or no cover may be used with the cooking device for other cooking modes. In particular, without any solid cover 252, the cooking device 240 operates in an indirect/direct grilling mode. Food or other items positioned on the cooking plate 226 above the rectangular horn shaped upper body 246 cook directly since the solid fuel is carried therein. Food or other items positioned outside the rectangular horn shaped upper body 246 on the cooking plate 226 cook indirectly.

Figure 18:
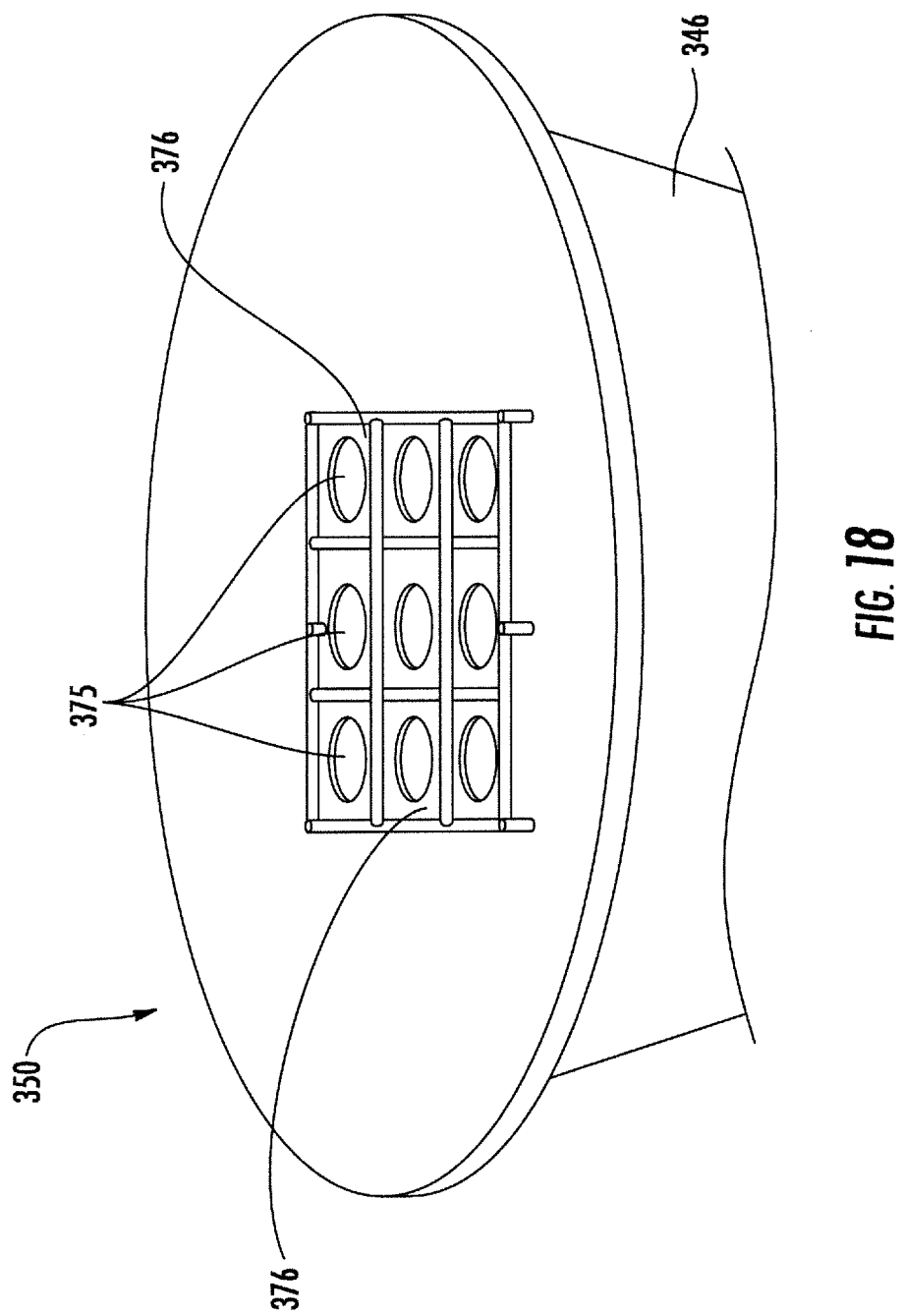
FIG. 18 is a perspective view of a solid cover according to another embodiment.

Referring now additionally to FIG. 18, other cooking modes may also be achieved using different interchangeable covers. In particular, a cover 350 in the form of a plate having an array of openings 375 and carried by the upper open end of the rectangular horn shaped upper body 346 and aligned with the fuel container (i.e., above the solid-fuel) may be particularly advantageous for a stove or cooktop mode. In the stove or cooktop mode, a pot, pan, griddle or other cooking container may be placed over the array of openings 375 and spaced apart therefrom by a riser 376. The riser 376 spaces the cooking container from the array of openings 375 to allow heat to pass therefrom. Other covers may also be used, for example, a solid stone or ceramic cover for cooking pizzas in a "brick oven" mode.

A method aspect is directed to a method of making a solid cover 252 for a solid-fuel cooker 220 that includes a firebox 221 for carrying solid fuel therein and having a base 223 and a sidewall 224 extending upwardly from the base, and a cooking plate 226 to be carried adjacent the firebox and defining a first cooking surface. The solid-fuel cooker 220 includes a tubular fuel container 241 for carrying the solid-fuel therein, and to be carried within the firebox 221 and spaced inwardly from the sidewall 224. The tubular fuel container 241 has upper and lower open ends 247, 243b. The solid cover 252 is to be carried by the open upper end 247 of the tubular fuel container 241. The method includes forming a cover base 266 having opposing first and second surfaces 267, 268, the first surface defining a second cooking surface, and the second surface coupled to the upper open end 247 of the tubular fuel container 241 to define an air seal therewith. The method also includes forming a cover sidewall 269 extending upwardly from the first surface 267 of the cover base 266 spacing the cooking plate 226 from the cover base 266.

While exemplary dimensions and shapes of exemplary cooking devices have been described herein, it will be appreciated that the cooking device may be sized and shaped to achieve desired results and to fit in nearly any sized solid-fuel cooker. In other words, in some embodiments, the tubular lower body may have the same shape as the upper body. The upper body may not be tapered.

Figure 19:
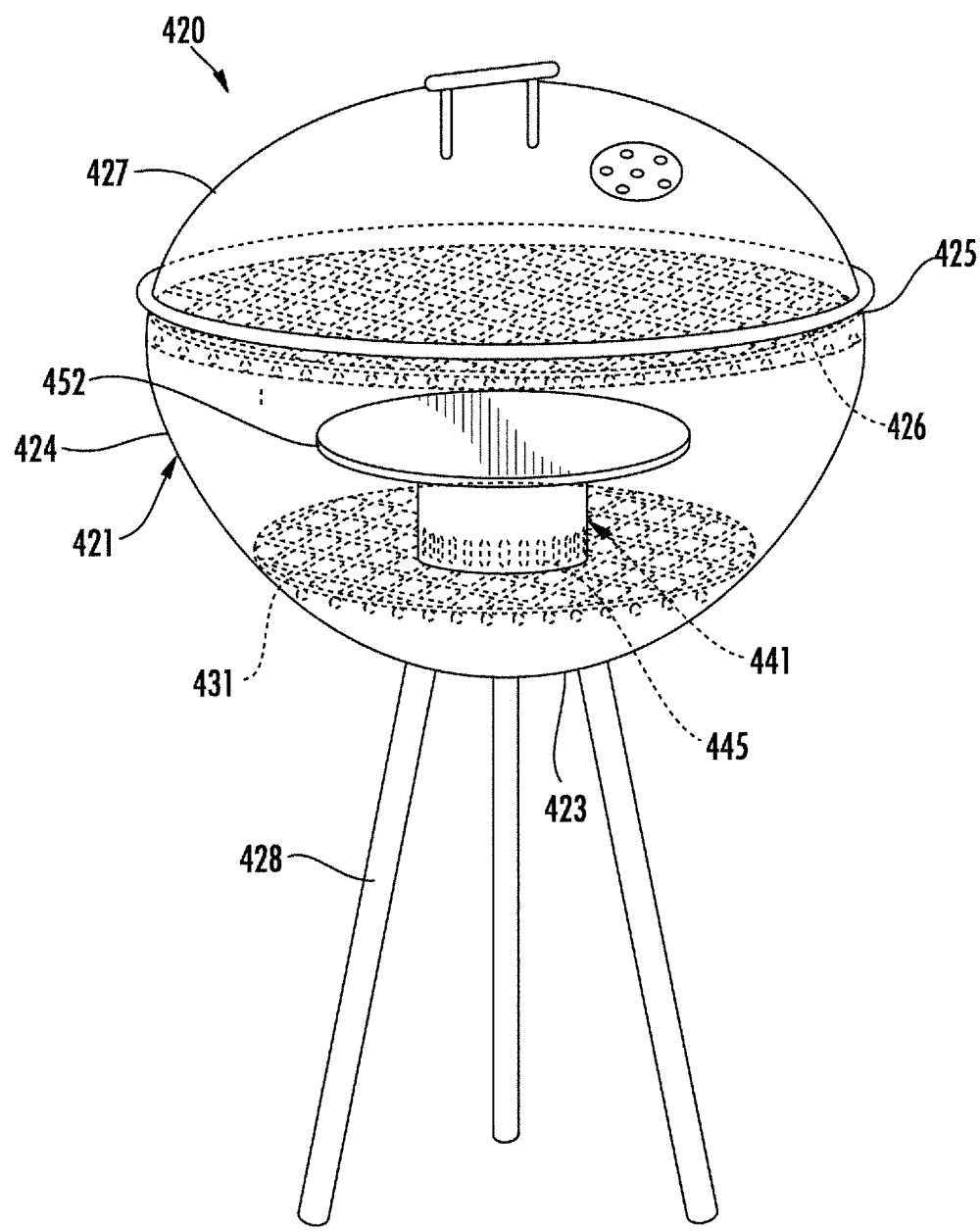
FIG. 19 is a perspective view of a solid-fuel cooker including a cooking device in accordance with another embodiment.
Figure 20:
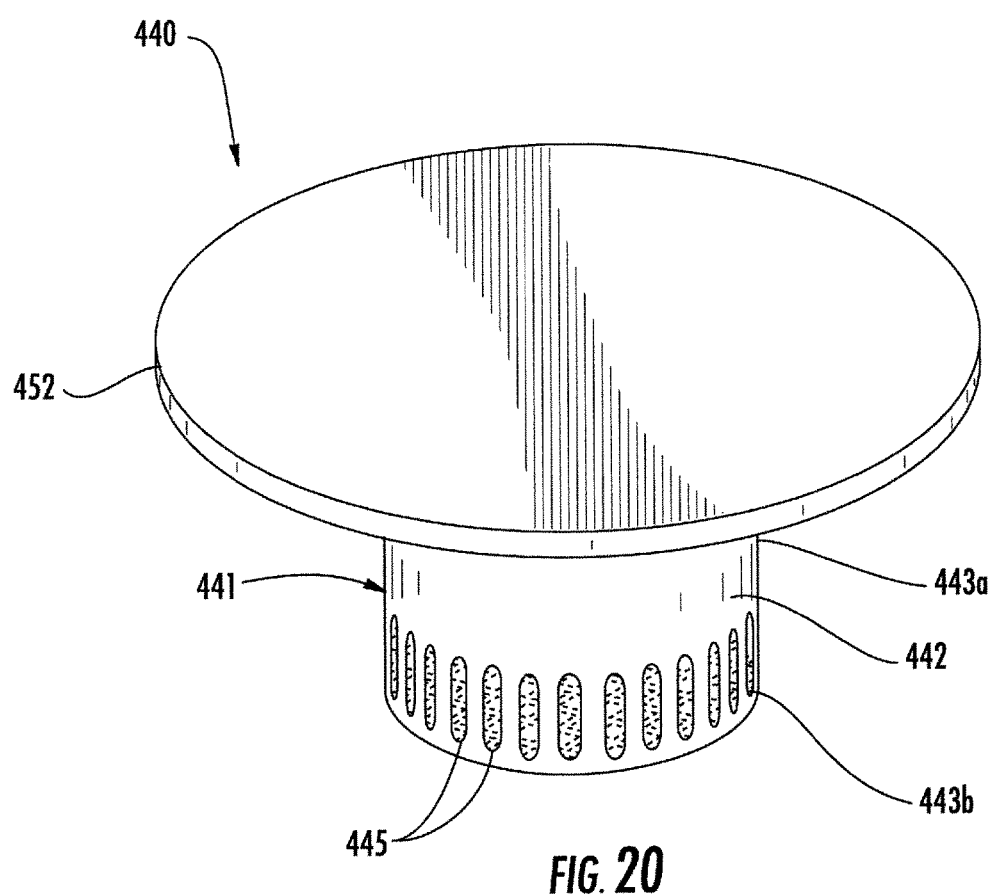
FIG. 20 is a perspective view of the cooking device of FIG. 19 removed from the solid-fuel cooker.
Figure 21:
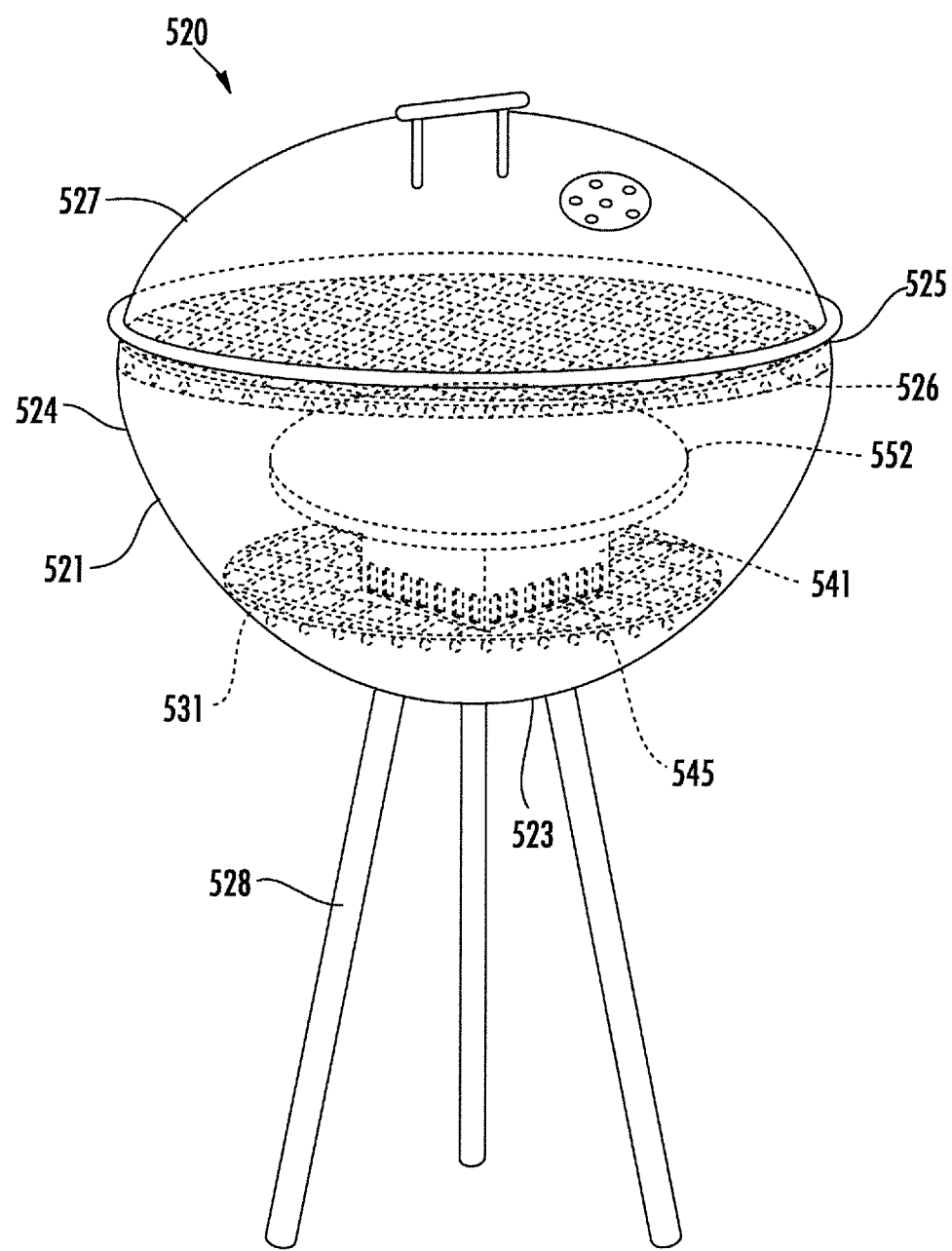
FIG. 21 is a perspective view of a solid-fuel cooker including a cooking device in accordance with another embodiment.
Figure 22:
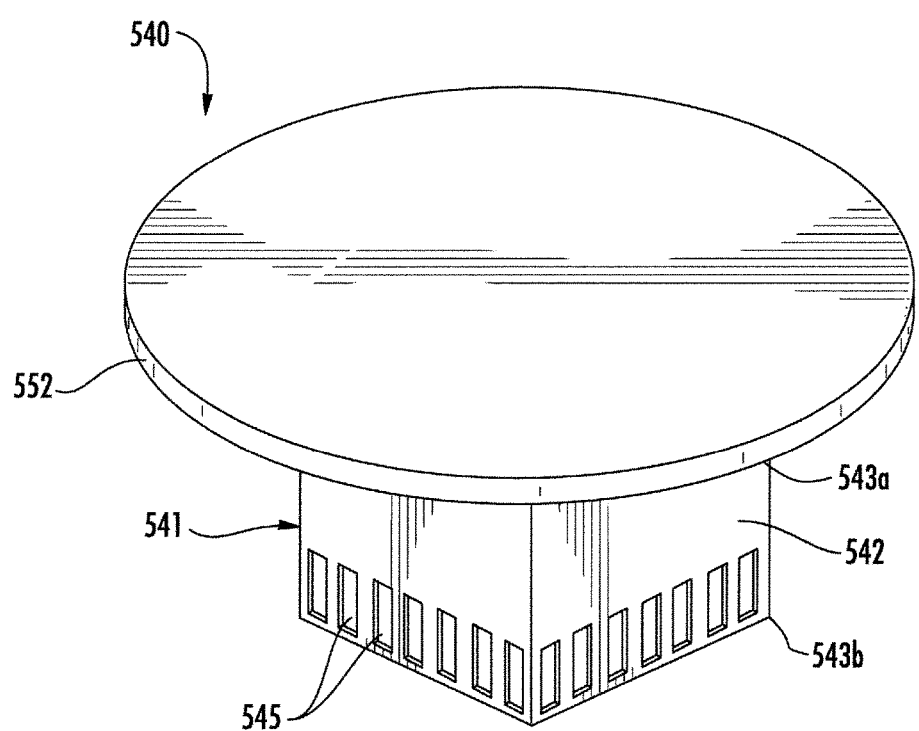
FIG. 22 is a perspective view of the cooking device of FIG. 21 removed from the solid-fuel cooker.

For example, referring now to FIGS. 19-20, in one embodiment of the cooking device 440, the fuel container 441 may be a single tubular body, for example, a cylindrically shaped tubular body without a tapered end (i.e., a constant diameter). A mesh 471 may be carried adjacent the lower open end 443b of the cylindrically shaped tubular body 441, for example, for increased rigidity and so that larger pieces of unburned solid fuel are retained in the fuel container 441, for example. FIGS. 21-22 illustrate another embodiment of the cooking device 540 wherein the fuel container 541 has a single rectangular or square shaped fuel container without a tapered upper body.

As will be appreciated by those skilled in the art, not having a tapered upper body reduces the amount of solid fuel that can be held, which make it suitable for smaller solid fuel cookers or shorter durations of cooking. Moreover, when used with the smoker-hibachi solid cover 252 described above, the fuel containers 441, 541 may provide more defined cooking zones with larger difference in temperature. However, it will be appreciated that any of the covers described above may be used with the fuel containers 441, 541.

Another method aspect is directed to a method of making a cooking device for a solid-fuel cooker 420, 520 that includes a firebox 421, 521 for carrying solid-fuel therein and having a base 423, 523 and at least one sidewall 424, 524 extending upwardly from the base, and a cooking plate 426, 526 to be carried adjacent the firebox and defining a cooking surface. The method includes forming a tubular fuel container 441, 541 for carrying the solid-fuel therein, and to be carried within the firebox 421, 521 and spaced inwardly from the at least one sidewall 424, 524. The tubular fuel container 441, 551 is formed to have upper and lower open ends 443a, 543a, 443b, 543b adjacent the cooking surface 426, 526 and the base 423, 523 of the solid-fuel cooker 420, 520, respectively. The method also includes forming a solid cover 452, 552 to be carried by the upper open end 443a, 553a of the tubular fuel container 441, 551.

Many modifications and other embodiments of the invention will also come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A cooking device for a solid-fuel cooker comprising a firebox for carrying solid-fuel therein and having a base and at least one sidewall extending upwardly from the base, and a cooking plate to be carried adjacent the firebox and defining a cooking surface, the cooking device comprising:
 a tubular fuel container for carrying the solid-fuel therein, and to be carried within the firebox and spaced inwardly from the at least one sidewall, said tubular fuel container having upper and lower open ends adjacent the cooking surface and the base of the solid-fuel cooker, respectively; and
 a solid cover coupled to the upper open end of said tubular fuel container to define a seal therewith.

2. The cooking device of claim 1 wherein said tubular fuel container comprises at least one sidewall having a plurality of air openings therein.

3. The cooking device of claim 1 wherein said solid cover extends outwardly beyond an outer edge of the upper open end of said tubular fuel container.

4. The cooking device of claim 1 wherein the solid-fuel cooker further comprises a solid-fuel plate carried below the cooking surface; and wherein the open lower end of said tubular fuel container is carried by the solid-fuel plate.

5. The cooking device of claim 1 wherein said tubular fuel container has a plurality of temperature control openings therein adjacent said solid cover.

6. The cooking device of claim 5 wherein the plurality of temperature control openings have a first opening area associated therewith; wherein said tubular fuel container has a plurality of air openings therein adjacent the lower open end and having a second opening area associated therewith; and wherein the second opening area is greater than the first opening area.

7. The cooking device of claim 1 further comprising a mesh plate carried within said tubular fuel container adjacent the lower open end.

8. The cooking device of claim 1 wherein said tubular fuel container has a rectangular shape.

9. The cooking device of claim 1 wherein said tubular fuel container has a circular shape.

10. The cooking device of claim 1 wherein said solid cover has a circular shape.

11. A cooking device for a solid-fuel cooker comprising a firebox for carrying solid-fuel therein and having a base and at least one sidewall extending upwardly from the base, and a cooking plate to be carried adjacent the firebox and defining a cooking surface, the cooking device comprising:
 a cylindrical fuel container for carrying the solid-fuel therein, and to be carried within the firebox and spaced inwardly from the at least one sidewall, said tubular fuel container having upper and lower open ends adjacent the cooking surface and the base of the solid-fuel cooker, respectively and comprising at least one container sidewall having a plurality of air openings therein adjacent the lower open end; and
 a solid cover coupled to the upper open end of said cylindrical fuel container to define a seal therewith.

12. The cooking device of claim 11 wherein said solid cover extends outwardly beyond an outer edge of the upper open end of said cylindrical fuel container.

13. The cooking device of claim 11 wherein the solid-fuel cooker further comprises a solid-fuel plate carried below the first cooking surface; and wherein the open lower end of said cylindrical fuel container is carried by the solid-fuel plate.

14. The cooking device of claim 11 wherein said at least one container sidewall has a plurality of temperature control openings therein adjacent said solid cover.

15. The cooking device of claim 11 wherein said solid cover has a circular shape.

16. A cooking device for a solid-fuel cooker comprising a firebox for carrying solid-fuel therein and having a base and at least one sidewall extending upwardly from the base, and a cooking plate to be carried adjacent the firebox and defining a cooking surface, the cooking device comprising:
 a rectangular fuel container for carrying the solid-fuel therein, and to be carried within the firebox and spaced inwardly from the at least one sidewall, said tubular fuel container having upper and lower open ends adjacent the cooking surface and the base of the solid-fuel cooker, respectively and comprising a plurality of container sidewalls each having a plurality of air openings therein adjacent the lower open end; and
 a solid cover coupled to the upper open end of said rectangular fuel container to define a seal therewith.

17. The cooking device of claim 16 wherein said solid cover extends outwardly beyond an outer edge of the upper open end of said rectangular fuel container.

18. The cooking device of claim 16 wherein the solid-fuel cooker further comprises a solid-fuel plate carried below the cooking surface; and wherein the open lower end of said cylindrical fuel container is carried by the solid-fuel plate.

19. The cooking device of claim 16 wherein said plurality of container sidewalls each has at least one temperature control openings therein adjacent said solid cover.

20. The cooking device of claim 16 wherein said solid cover has a circular shape.

21. A method of making a cooking device for a solid-fuel cooker comprising a firebox for carrying solid-fuel therein and having a base and at least one sidewall extending upwardly from the base, and a cooking plate to be carried adjacent the firebox and defining a cooking surface, the method comprising:
 forming a tubular fuel container for carrying the solid-fuel therein, and to be carried within the firebox and spaced inwardly from the at least one sidewall, the tubular fuel container being formed to have upper and lower open ends adjacent the cooking surface and the base of the solid-fuel cooker, respectively; and
 forming a solid cover to be coupled to the upper open end of the tubular fuel container to define a seal therewith.

22. The method of claim 21 wherein forming the tubular fuel container comprises forming at least one sidewall having a plurality of air openings therein.

23. The method of claim 21 wherein forming the solid cover comprises forming the solid cover to extend outwardly beyond an outer edge of the upper open end of the tubular fuel container.

24. The method of claim 21 wherein forming the tubular fuel container comprises forming the tubular fuel container to have a plurality of temperature control openings therein adjacent the solid cover.

25. The method of claim 21 wherein forming the tubular fuel container comprises forming a rectangular fuel container.

26. The method of claim 21 wherein forming the tubular fuel comprises forming a cylindrical fuel container.

27. The method of claim 21 wherein forming the solid cover comprises forming the solid cover to have a circular shape.

* * * * *